United States Patent
Yoon et al.

(10) Patent No.: US 6,292,291 B1
(45) Date of Patent: Sep. 18, 2001

(54) OPTICAL FIBER AMPLIFIER HAVING CONSTANT OUTPUT POWER FOR EACH CHANNEL AND AMPLIFYING METHOD THEREOF

(75) Inventors: Soo-young Yoon, Yongin; Rae-sung Jung, Suwon; Seong-taek Hwang; Sung-jun Kim, both of Pyeongtaek, all of (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 09/448,870

(22) Filed: Nov. 24, 1999

(30) Foreign Application Priority Data

Nov. 24, 1998 (KR) .................................. 98-50473

(51) Int. Cl.$^7$ ...................................................... H01S 3/00
(52) U.S. Cl. ................................. 359/337.13; 359/341
(58) Field of Search ............................... 359/194, 337, 359/341, 349

(56) References Cited

U.S. PATENT DOCUMENTS

| | | | |
|---|---|---|---|
| 5,673,129 | 9/1997 | Mizrahi | 359/124 |
| 5,768,012 | 6/1998 | Zanoni et al. | 359/341 |
| 5,808,785 * | 9/1998 | Nakabayashi | 359/341 |
| 5,808,788 * | 9/1998 | Park et al. | 356/341 |
| 5,812,710 * | 9/1998 | Sugaya | 385/27 |
| 5,822,112 * | 10/1998 | Itou et al. | 359/341 |
| 5,907,429 * | 5/1999 | Sugata | 359/341 |
| 5,912,760 * | 6/1999 | Sugiya | 359/341 |
| 5,995,274 * | 11/1999 | Sugaya et al. | 359/337 |
| 5,995,275 * | 11/1999 | Sugaya | 359/341 |
| 6,038,062 * | 3/2000 | Kosaka | 359/337 |
| 6,064,515 * | 5/2000 | Yang | 359/341 |
| 6,067,187 * | 5/2000 | Onaka et al. | 359/341 |
| 6,108,123 * | 8/2000 | Kinoshita | 359/337 |

FOREIGN PATENT DOCUMENTS

| | | |
|---|---|---|
| 2317044 | 11/1998 | (GB) . |
| 2317044-A * | 11/1998 | (GB) ................................. H01S/3/06 |

* cited by examiner

*Primary Examiner*—Thomas H. Tarcza
*Assistant Examiner*—Deandra Hughes
(74) *Attorney, Agent, or Firm*—Robert E. Bushnell, Esq.

(57) ABSTRACT

An optical fiber amplifier having constant output power for each channel including a first measuring unit for dividing an input light signal into a first light signal and a second light signal, sub-dividing the first light signal into a plurality of light signals and converting the plurality of light signals into electrical signals to output the electrical signals, an optical fiber amplifying unit for amplifying the second light signal according to a predetermined amplification control value, a second measuring unit for converting a light signal of a predetermined wavelength band, output from the optical fiber amplifying unit, into an electrical signal, and an output power controller for controlling the predetermined amplification control value according to a plurality of output values of the first measuring unit and an output value of the second measuring unit, so that the power level of the optical fiber amplifying unit is maintained at a constant level.

13 Claims, 3 Drawing Sheets

OPTICAL FIBER AMPLIFIER HAVING CONSTANT OUTPUT POWER FOR EACH CHANNEL AND AMPLIFYING METHOD THEREOF

CLAIM OF PRIORITY

This application makes reference to, incorporates the same herein, and claims all benefits accruing under 35 U.S.C § 119 from an application entitled Optical Fiber Amplifier Having Constant Output Power For Each Channel And Amplifying Method Thereof earlier filed in the Korean Industrial Property Office on Nov. 24, 1998, and there duly assigned Ser. No. 98-50473 by that Office.

BACKGROUND OF THE INVENTION

1. Field of the Invention

The present invention relates to an optical fiber amplifier having constant output power for each channel and an amplifying method thereof.

2. Description of the Related Art

In an optical transmission system, an erbium doped fiber amplifier (EDFA) directly amplifies an optical signal that has been weakened during transmission without converting the optical signal into an electrical signal, thus remarkably extending the transmission distance. U.S. Pat. No. 5,768,012 to Raymond Zanoni et al. entitled Apparatus And Method For The High-Power Pumping Of Fiber Optic Amplifiers and U.S. Pat. No. 5,673,129 to Victor Mizrahi entitled WDM Optical Communication Systems With Wavelength Stabilized Optical Selectors are examples of known optical amplifiers.

Wavelength division multiplexing (WDM) optical fiber amplifiers can be generally classified into two groups; automatic gain control (AGC) optical fiber amplifiers in which the gain for each channel is maintained to be constant, and automatic level control (ALC) optical fiber amplifiers in which the output power level for each channel is maintained to be constant.

An AGC optical fiber amplifier can compensate a loss generated in a transmission path because the gain for each channel is maintained at a constant level according to a variation in the power levels of all input signals. In other words, the power level of a signal amplified by an amplifier gradually decreases while passing through the transmission path, and then restored to its original level after passing through the AGC optical fiber amplifier having the same level of the gain as that of the transmission loss. However, the performance of a general optical amplifier used as the transmission path slowly degraded with passing of time and a loss between amplifiers sharply increases. Also, a loss at a certain block of the transmission may abruptly increase due to a temporary problem. In the case of employing the AGC optical fiber amplifier in a transmission path having the above-described characteristics, the power level of a light signal gradually decreases with an increase in the transmission distance due to deterioration of the transmission path or a temporary problem thereof. Repetition of this phenomenon may considerably reduce the power level of a light signal which is input to a final input port compared to an initially set power level of the light signal. Accordingly, in the case where light signals are received in the input port with less than the minimum requirement of reception sensitivity, many en-or signals may be produced.

FIG. 1A shows a change in the signal power level on a transmission path using the AGC optical fiber amplifier, in which '100' denotes an ideal output power level and '101' denotes an actual output power level. Referring to FIG. 1A, while the gain of the AGC optical fiber amplifier is maintained at a constant value according to the transmission distance, the output power levels are not constant.

An ALC optical fiber amplifier can suppress deterioration in the performance of a transmission system due to deterioration in the performance of a transmission path or an increased loss of a certain block of the transmission path, because the output power level is maintained at a constant level while the gain for each channel varies according to a variation in the power level of an input signal.

FIG. 1B shows a change in the signal power level on a transmission path using the ALC optical fiber amplifier, in which '102' denotes an ideal output power level and '103' denotes an actual output power level. Referring to FIG. 1B, while the gain of the ALC optical fiber amplifier is varied according to the transmission distance, the output power levels are maintained at a constant level. In order to maintain the output level for each channel at a constant level, the ALC optical fiber amplifier must receive channel add/drop information from the outside.

SUMMARY OF THE INVENTION

To solve the above problems, it is an objective of the present invention to provide an optical fiber amplifier for a constant output level for each channel, which confers different loss characteristics on input light signals according to channels, obtains channel information by comparing a plurality of lossy channels, and amplifies the light signals according to the channel information.

Accordingly, to achieve the above objective, there is provided an optical fiber amplifier having constant output power for each channel including a first measuring unit for dividing an input light signal into a first light signal and a second light signal, sub-dividing the first light signal into a plurality of light signals and converting the plurality of light signals into electrical signals to output the electrical signals, an optical fiber amplifying unit for amplifying the second light signal according to a predetermined amplification control value, a second measuring unit for converting a light signal of a predetermined wavelength band, output from the optical fiber amplifying unit, into an electrical signal, and an output power controller for controlling the predetermined amplification control value according to a plurality of output values of the first measuring unit and an output value of the second measuring unit, so that the power level of the optical fiber amplifying unit is maintained at a constant level.

According to another aspect of the present invention, there is provided an amplifying method for constant output power for each channel including the steps of (a) dividing an input light signal into two signals and amplifying one of the two divided signals according to a predetermined amplification control value, (b) measuring ASE (amplified spontaneous emission) intensity in a predetermined wavelength band from the amplified light signal, (c) sub-dividing the other signal divided in step (a) into a plurality of light signals and inducing different losses to the sub-divided light signals according to wavelengths, and (d) comparing the power levels of the loss-induced light signals of step (c) and controlling the predetermined amplification control value of step (a) so that the ASE intensity measured in step (b) is maintained at a constant level if the compared power levels of the light signals are substantially different. Additionally, the predetermined amplification control value of step (a) is controlled so that the ASE intensity measured in step (b) is increased if the compared power levels of the light signals are substantially the same.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1A:
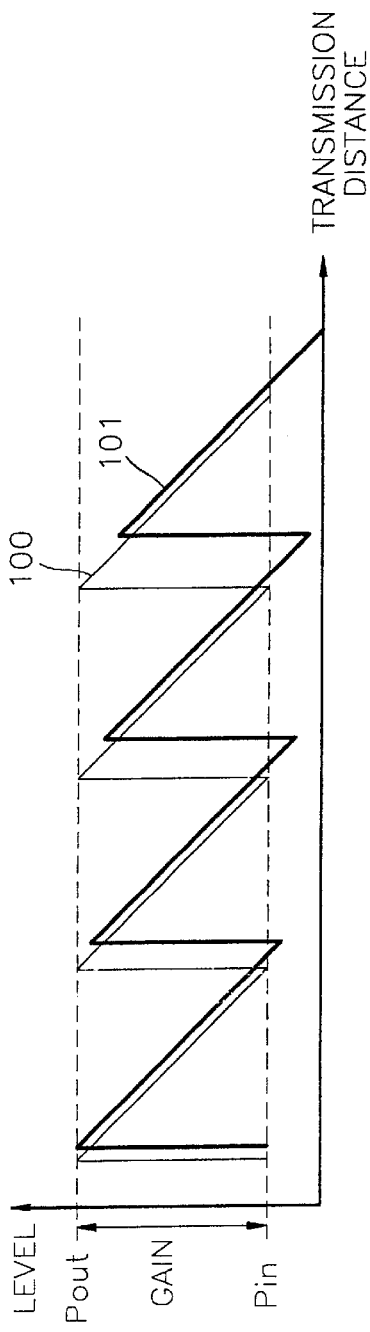
FIGS. 1A and 1B show a variation in the power level of a signal on a transmission path using an exemplary automatic gain control optical fiber amplifier and an exemplary automatic level control optical fiber amplifier, respectively.
Figure 1B:
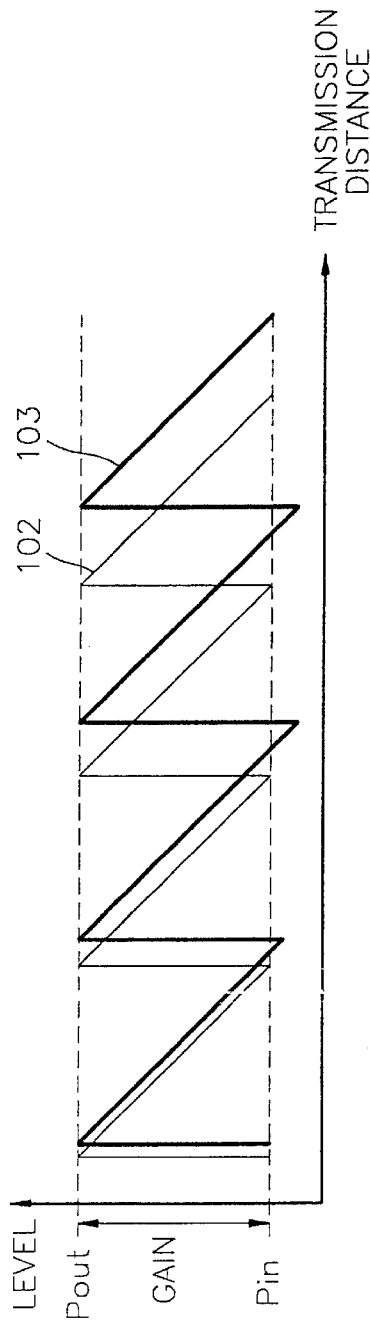
Figure 2:
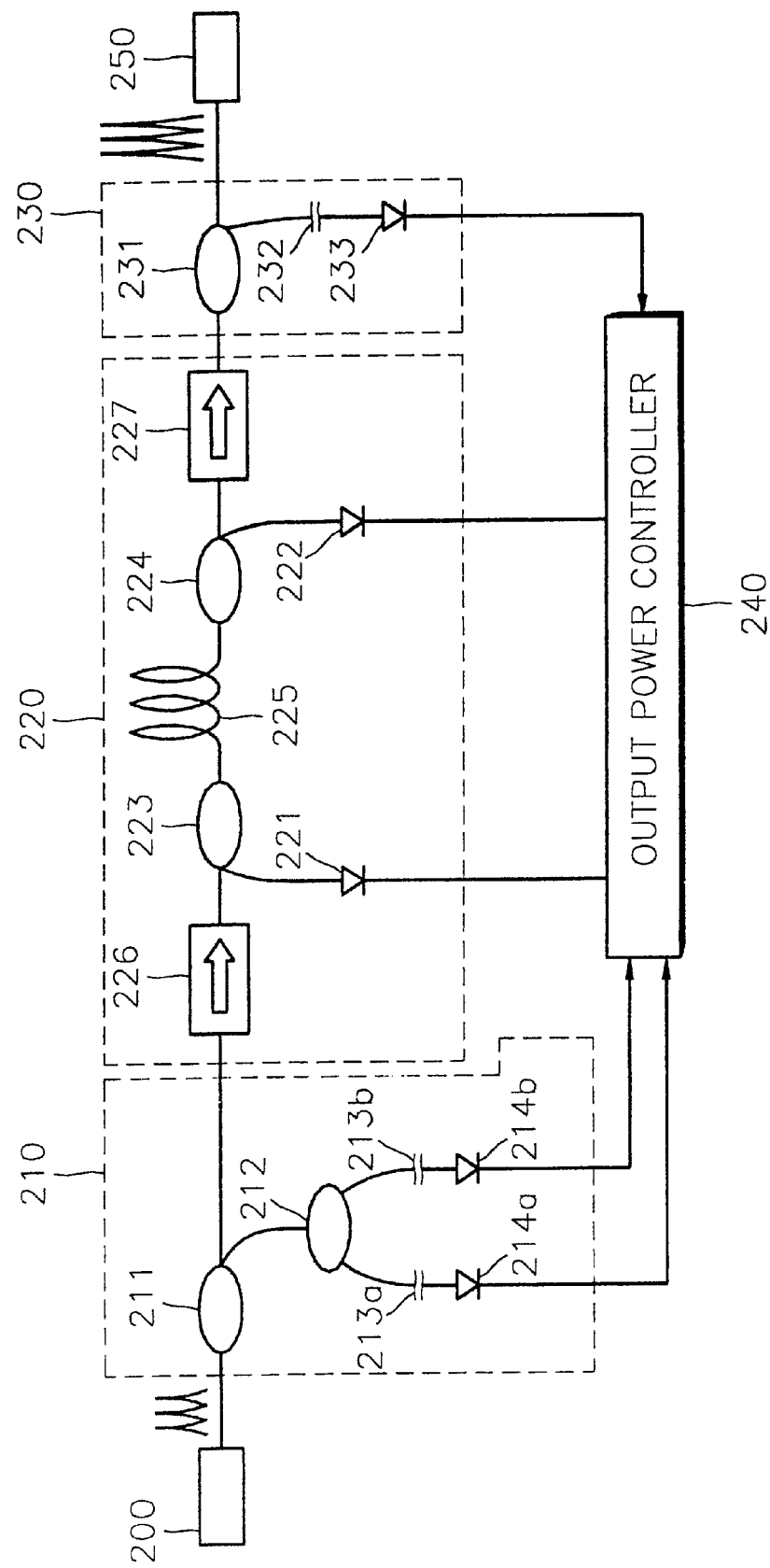
FIG. 2 is a schematic diagram of an optical fiber amplifier for a constant output power level for each channel according to the present invention.

Referring to FIG. 2, an optical fiber amplifier for a constant output power level for each channel according to the present invention includes an input port 200, a first measuring unit 210, an optical fiber amplifying unit 220, a second measuring unit 230, an output power controller 240 and an output port 250.

The first measuring unit 210 includes a first light divider 211 for dividing input light signals in a predetermined ratio, a second light divider 212 for sub-dividing one of the divided light signals output from the first light divider 211 in a predetermined ratio, first and second filters 213a and 213b connected to output ports of the second light divider 212 and having symmetrical loss characteristics with respect to wavelengths, and first and second light receiving elements 214a and 214b for converting light signals output from the first and second filters 213a and 213b to electrical signals and outputting the electrical signals to the output power controller 240. Here, the second light divider 212 may divide an input light signal into a plurality of light signals based on wavelength. In this case, a plurality of filters and light receiving elements are connected to the respective output ports of the second light divider 212, and loss characteristics of the respective filters are different from one another.

As an example to illustrate the present invention, the second light divider 212 divides the input light signal into two, which will be described below.

The optical fiber amplifying unit 220 includes first and second pump light sources 221 and 222 for generating pump light, first and second wavelength-division couplers 223 and 224 for coupling the pump light and signal light, an amplification optical fiber 225 for amplifying the signal light according to the pump light, and first and second isolators 226 and 227 for preventing amplified spontaneous emission (ASE) generated by the amplification optical fiber 225 from being reflected at an input port 200 and an output port 250 and re-entering the amplification optical fiber 225.

The second measuring unit 230 includes a third light divider 231 for dividing light signals output from the optical fiber amplifying unit 220, a third filter 232 for allowing only a predetermined wavelength band of a light signal output from the third light divider 231 to pass through, and a third light receiving element 233 for converting the light signal output from the third filter 232 into an electrical signal.

Figure 3A:
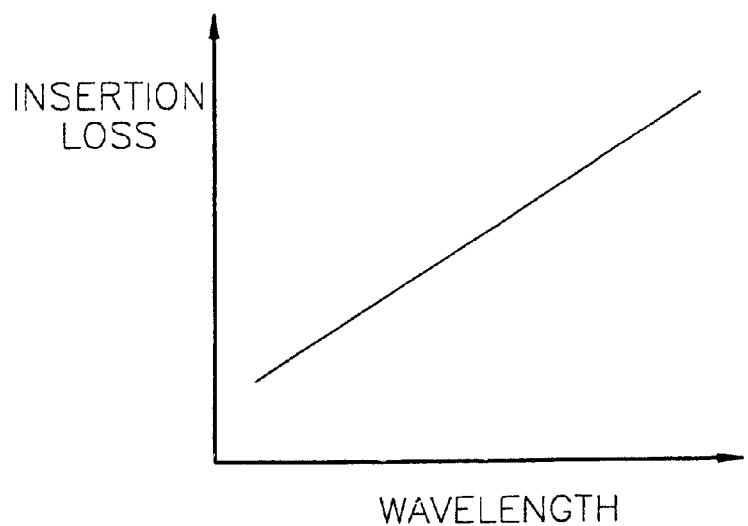
FIGS. 3A and 3B show loss characteristics of first and second filters shown in FIG. 2.
Figure 3B:
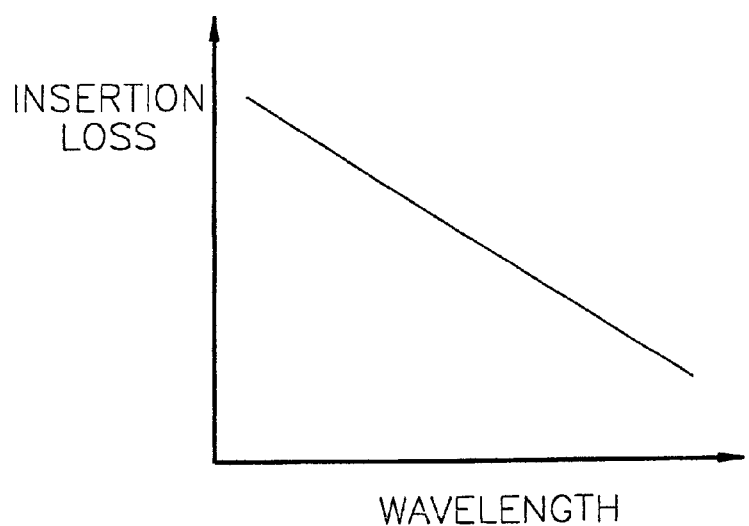

The optical fiber amplifier having the aforementioned configuration operates as follows. The first light divider 211 divides a light signal incident from the input port 200 into two light signals in a predetermined ratio and outputs one of the divided light signals to the optical fiber amplifying unit 220. The second light divider 212 divides the remaining light signals divided by the first light divider 211 into two signals equally, i.e., in a ratio of 1:1. The first and second filters 213a and 213b filter the two light signals output from the second light divider 212, respectively, while causing losses thereto. Here, the first and second filters 213a and 213b are wide-band filters. The losses occurring at the first and second filters 213a and 213b are symmetrical with respect to the wavelength, as shown in FIGS. 3A and 3B. This is because the power levels of the light signals that have passed through the first and second filters 213a and 213b, and as such, have undergone losses, are the same as each other when only the overall power level of input signals is changed without a change in the number of channels. However, when the overall signal power level is changed due to a change in the number of channels by the action of an add/drop multiplexer, the power levels of the respective light signals having passed through the first and second filters 213a and 213b vary according to a change in the number of channels.

The first and second light receiving elements 214a and 214b convert light signals output from the first and second filters 213a and 213b into electrical signals and output the electrical signals to the output power controller 240. The output power controller 240 can measure a change in the power level of an input signal and a change in the number of channels on a real-time basis using the electrical signals.

The other light signal divided in the first light divider 211 is incident into the amplification optical fiber 225 via the first isolator 226 and the first wavelength-division coupler 223. The first and second pump light sources 221 and 222 generate pump lights whose power levels are adjusted according to the amplification control value output from the output power controller 240. The amplification optical fiber 225 amplifies the signal light incident from the first wavelength-division coupler 223 according to the pump light incident through the first and second wavelength-division couplers 223 and 224.

The third light divider 231 divides a light signal output from the optical fiber amplifying unit 220 into two signals and outputs one of the divided light signals to the output port 250. The third filter 232 filters the remaining divided light signal output from the third light divider 231 in a predetermined wavelength band. Here, the third filter 232 is a narrow bandpass filter, and passes the ASE of the amplified output light signal, wherein the narrow bandpass filter has a central frequency disposed out of a signal channel band so as to measure amplified spontaneous emission generated from the optical fiber amplifying unit and disposed in the amplified spontaneous emission band. Thus, the central wavelength of the third filter 232 is properly outside the range in which the channels of a light signal exist. The following table demonstrates the ASE intensities of the optical fiber amplifying unit 220 with respect to a change in the number of added/dropped channels.

TABLE 1

| Number of channels | 1532 ASE | 1540 ASE | 1560 ASE | Maximum power for each channel | ΔP |
|---|---|---|---|---|---|
| 16 | −19.27 | −25.73 | −25.63 | 4.11 | 0.4 |
| 15 | −19.03 | −25.58 | −25.53 | 4.22 | 0.43 |
| 14 | −19.15 | −25.64 | −25.55 | 4.16 | 0.4 |
| 13 | −18.89 | −25.44 | −25.42 | 4.22 | 0.4 |
| 12 | −19.02 | −25.53 | −25.54 | 4.13 | 0.28 |
| 8 | −18.83 | −25.27 | −25.48 | 4.21 | 0.27 |
| 4 | −18.88 | −25.14 | −25.45 | 4.16 | 0.24 |
| 2 | −19.2 | −25.44 | −25.56 | 4.06 | 0.23 |
| 1 | −18.95 | −24.99 | −25.36 | 4.24 | 0.21 |
| Maximum ASE | −18.83 | −24.99 | −25.36 | | |
| Minimum ASE | −19.27 | −25.73 | −25.63 | | |
| ΔASE | 0.44 | 0.74 | 0.27 | | |

Table 1 shows that ASE (amplified spontaneous emission) is maintained at a substantially constant level when the optical fiber amplifier for a constant output power level for each channel operates. The light signal output from the third filter 232 is converted into an electrical signal by the third light receiving element 233 to then be output to the output power controller 240.

The output power controller 240 controls the output power levels of the pump light sources 221 and 222 in accordance with the power level of the input signal and the information on a change in the number of channels which are obtained from the first and second light receiving elements 214*a* and 214*b*, and the information on the power level of the output signal for each channel which is obtained from the third light receiving element 233, thereby controlling the power level of each channel to be constant. For example, if attenuation of the power level of an input light signal is caused by a change in the number of channels, the power levels of the pump light sources 221 and 222 are adjusted such that the output power level of the third light receiving element 233 is maintained at a constant level. If the attenuation of the power level of an input light signal is caused by a decrease in the overall power level of input signals, rather than by a change in the number of channels, the power levels of the pump light sources 221 and 222 are adjusted such that the output power level of the third light receiving element 233 is increased.

According to the present invention, even if the channel information of an input light signal is not applied externally, the output power level for each channel can be maintained at a constant level. Thus, the configuration of a wavelength-division transmission system can be simplified. Also, the present invention can be applied to a transmission path which requires an optical fiber operating at a high speed for supporting a channel add/drop action. Further, the stability of the overall transmission path can be enhanced.

What is claimed is:

1. An optical fiber amplifier having constant output power for each channel comprising:
    a first measuring unit for dividing an input light signal into a first light signal and a second light signal, sub-dividing the first light signal into a plurality of light signals and converting the plurality of light signals into electrical signals to output the electrical signals;
    an optical fiber amplifying unit for amplifying, the second light signal according to a predetermined amplification control value;
    a second measuring unit for converting a light signal of a predetermined wavelength band, output from the optical fiber amplifying unit, into an electrical signal; and
    an output power controller for controlling the predetermined amplification control value according to a plurality of output values of the first measuring unit and an output value of the second measuring unit, so that the power level of the optical fiber amplifying unit is maintained at a constant level, wherein the first measuring unit comprises:
    a first light divider for dividing the input light signal into said first and second light signals;
    a second light divider in which said first light signal is sub-divided into said plurality of light signals;
    a plurality of loss inducing means having asymmetric loss inducing characteristics along a wavelength axis characterized in that each said loss inducing means induces a different loss characteristics to respective ones of said plurality of light signals output from the second light divider according to respective wavelengths of each of the plurality of light signals; and
    a plurality of light receiving elements for converting the output signals of the plurality of loss inducing means into electrical signals and outputting the electrical signals to the output power controller.

2. The optical fiber amplifier according to claim 1, wherein the plurality of loss inducing means are wide-band filters having loss characteristics which vary according to the wavelengths of the respective plurality of light signals.

3. The optical fiber amplifier according to claim 1, wherein the second measuring unit comprises:
    a light divider for dividing the output light signal of the optical fiber amplifying unit into two signals at a predetermined ratio;
    a narrow bandpass filter for filtering one of said light signals output by the third light divider in a predetermined wavelength band; and
    a light receiving element for converting the output light signal of the narrow bandpass filter into an electrical signal and outputting the electrical signal to the output power controller.

4. The optical fiber amplifier according to claim 3, wherein the narrow bandpass filter has a central frequency disposed out of a signal channel band so as to measure amplified spontaneous emission generated from the optical fiber amplifying unit and disposed in the amplified spontaneous emission band.

5. An amplifying method for constant output power for each channel comprising the steps of:
    (a) dividing an input light signal into two signals and amplifying one of the two divided signals according to a predetermined amplification control value;
    (b) measuring amplified spontaneous emission intensity in a predetermined wavelength band from the amplified light signal;
    (c) sub-dividing the other signal divided in step (a) into a plurality of light signals and inducing different losses to the sub-divided light signals according to respective wavelengths of the plurality of light signals; and
    (d) comparing the power levels of the loss-induced light signals of step (c) and controlling the predetermined amplification control value of step (a) so that the amplified spontaneous emission intensity measured in step (b) is maintained at a constant level if the compared power levels of the light signals are substantially different.

6. The amplifying method according to claim 5, wherein step (d) includes a step of controlling the predetermined amplification control value so that the amplified spontaneous emission intensity is increased if the compared power levels of the light signals are substantially the same.

7. An optical fiber amplifier having constant output power for each channel comprising:

a first optical divider for dividing an optical signal received via an input port into a first optical signal and a second optical signal;

a second optical divider for dividing the first optical signal into a plurality of optical signals;

a plurality of loss inducing, means having asymmetric loss inducing characteristics along a wavelength axis such that each of said loss inducing means induces a different loss characteristic to a respective one of said plurality of optical signals output from the second optical divider according to respective wavelengths of each of the plurality of optical signals; and a plurality of photoelectric converters for respectively converting the output signals of the plurality of loss inducing means into electrical signals and outputting the electrical signals to the output power controller;

an optical fiber amplifying unit for amplifying the second optical signal according to a predetermined amplification control value;

a third optical divider for dividing an optical signal amplified by the optical fiber amplification unit at a predetermined ratio;

means for converting an optical signal of a predetermined wavelength band output from the optical fiber amplifying unit into an electrical signal; and an output power controller for controlling the predetermined amplification control value according to a plurality of output values of the first measuring unit and an output value of the second measuring unit, so that the power level of the optical fiber amplifying unit is maintained at a constant level.

8. The optical fiber amplifier according to claim 7, wherein said means for converting an optical signal of a predetermined wavelength band output from the optical fiber amplifying unit into an electrical signal comprises:

a narrow bandpass filter for filtering one of said optical signals output by the third optical divider in a predetermined wavelength band; and a photoelectric converter for converting the output optical signal of the narrow bandpass filter into an electrical signal and outputting the electrical signal to the output power controller.

9. The optical fiber amplifier according to claim 7, wherein said means for converting an optical signal of a predetermined wavelength band output from the optical fiber amplifying unit into an electrical signal comprises:

a narrow bandpass filter for filtering one of said optical signals output by the third optical divider in a predetermined wavelength band; and an optical receiving element for converting the output optical signal of the narrow bandpass filter into an electrical signal and outputting the electrical signal to the output power controller.

10. The optical fiber amplifier according to claim 8, wherein the narrow bandpass filter has a central frequency disposed out of a signal channel band so as to measure amplified spontaneous emission generated from the optical fiber amplifying unit and disposed in the amplified spontaneous emission band.

11. The optical fiber amplifier according to claim 9, wherein the narrow bandpass filter has a central frequency disposed out of a signal channel band so as to measure amplified spontaneous emission generated from the optical fiber amplifying unit and disposed in the amplified spontaneous emission band.

12. The optical fiber amplifier according to claim 9, wherein the output power controller compares the power levels of the loss-induced optical signals and controls the predetermined amplification control value so that an amplified spontaneous emission intensity is maintained at a constant level if the compared power levels of the optical signals are substantially different.

13. The optical fiber amplifier according to claim 9, wherein the output power controller compares the power levels of the loss-included optical signals and controls the predetermined amplification control value so that an amplified spontaneous emission intensity is increased if the compared power levels of the light signals are substantially the same.

* * * * *